United States Patent
Snider et al.

(10) Patent No.: US 7,350,954 B2
(45) Date of Patent: Apr. 1, 2008

(54) DISPLAY APPARATUS

(75) Inventors: Chris R. Snider, Kokomo, IN (US); Michael E. Fye, Kokomo, IN (US); Raymond Lippmann, Howell, MI (US); Gail M. Sylvester, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 270 days.

(21) Appl. No.: 11/194,173

(22) Filed: Aug. 1, 2005

(65) Prior Publication Data

US 2007/0025096 A1  Feb. 1, 2007

(51) Int. Cl.
*F21V 9/16* (2006.01)

(52) U.S. Cl. .......................... 362/612; 362/634; 362/84

(58) Field of Classification Search ................ 362/612, 362/633, 634, 29, 30, 555, 800, 632, 84; 349/58
See application file for complete search history.

(56) References Cited

U.S. PATENT DOCUMENTS

| | | | |
|---|---|---|---|
| 4,910,090 A | 3/1990 | Kuhlman et al. | |
| 5,063,379 A | 11/1991 | Fabry et al. | |
| 5,346,954 A | 9/1994 | Wu et al. | |
| 5,397,867 A | 3/1995 | Demeo | |
| 5,403,984 A | 4/1995 | Ogawa | |
| 5,432,684 A | 7/1995 | Fye et al. | |
| 5,477,430 A | 12/1995 | LaRose | |
| 5,500,497 A | 3/1996 | Merriman | |
| 5,510,782 A | 4/1996 | Norris et al. | |
| 5,568,367 A | 10/1996 | Park | |
| 5,584,380 A | 12/1996 | Naitou | |
| 5,613,750 A | 3/1997 | Roe | |
| 5,659,161 A | 8/1997 | Takanohashi et al. | |
| 5,718,326 A | 2/1998 | Larose et al. | |
| 5,736,233 A | 4/1998 | Fye | |
| 5,916,450 A | 6/1999 | Muggli et al. | |
| 5,951,349 A | 9/1999 | Larose et al. | |
| 6,111,696 A | 8/2000 | Allen et al. | |
| 6,394,619 B1 * | 5/2002 | Snider | 362/30 |
| 6,517,213 B1 | 2/2003 | Fujita et al. | |
| 6,595,653 B2 | 7/2003 | Saito et al. | |
| 6,608,271 B2 | 8/2003 | Duarte | |
| 6,658,773 B2 | 12/2003 | Rohne et al. | |
| 6,814,456 B1 * | 11/2004 | Huang et al. | 362/30 |
| 7,059,735 B2 * | 6/2006 | Orikasa | 362/23 |
| 2003/0038596 A1 | 2/2003 | Ho | |
| 2004/0120140 A1 | 6/2004 | Fye et al. | |
| 2005/0051782 A1 | 3/2005 | Negley et al. | |
| 2005/0281050 A1 * | 12/2005 | Chou | 362/612 |

FOREIGN PATENT DOCUMENTS

EP           0529832           3/1993

* cited by examiner

*Primary Examiner*—Stephen F. Husar
*Assistant Examiner*—Peggy A. Neils
(74) *Attorney, Agent, or Firm*—Jimmy L. Funke

(57) ABSTRACT

An holder or support for a backlit component is disclosed which provides display lighting for the backlit component. The holder may be a one-piece holder and may be made from a polymeric material including one or more fluorescing materials and/or diffusing substances. A trim plate for a backlit display is disclosed. The trim plate may have a front face which provides both a solid support for graphic indicia and display lighting for the graphic indicia.

6 Claims, 5 Drawing Sheets

DISPLAY APPARATUS

TECHNICAL BACKGROUND

The present invention relates to a support or a holder for a display and in particular to a support or holder that includes a fluorescing material to convert incident light of a first spectrum to displayed light of a second spectrum, and a cover having related graphic indicia and in particular to a cover that includes a fluorescing material to convert incident light of a first spectrum to displayed light of a second spectrum.

BACKGROUND OF THE INVENTION

Many displays, such as automotive displays, require some form of backlighting to provide proper visibility for nighttime viewing of the display. Example displays include buttons, liquid crystal displays, trim plates, and control knobs. Further, backlighting is sometimes required for proper daytime visibility of some negative image style displays.

Typically these displays are backlit by either a light emitting diode ("LED") or an incandescent lamp. When the illumination source is an incandescent lamp, the amount of heat generated is an issue of concern. LED's provide limited application because they are limited to the colors of the LED's. A white light LED is available but is more costly than more readily available LEDs, such as blue LEDs. It is known to use white light LEDs and filter the light to the appropriate color.

It is known to use a fluorescing material in the manufacture of backlit display assemblies, the fluorescing material being chosen to absorb light energy of a first spectrum and to emit light energy of a second spectrum. It is known to make button caps from a thermoplastic material including a fluorescing material to provide a backlit button which converts incident light from a blue LED to produce backlighting having a blue/green appearance. The button caps are subsequently painted white, painted black, and then laser etched to reveal the white paint in the portions of the button corresponding to the button indicia. Further, it is known to place substrates made from a fluorescing material behind a trim plate. Light from the fluorescing material passes through an opening in the trim plate aligned with graphics in an appliqué secured to the front of the trim plate to illuminate the graphics in the appliqué.

Further, holders for liquid crystal displays ("LCD") are known that are made from a molded plastic part. In addition, it is known to place one or more light sources behind an LCD to backlight the LCD to enhance the viewability of the LCD in low light environments, such as for nighttime viewing. Referring to FIG. 1, a holder 10 is shown. Holder 10 is made from a polymer comprised of a material such as ABS or Polycarbonate and may include reflective geometric surfaces to help reflect and direct illumination towards a LCD 26. A lower portion 12 of holder 10 is coupled to a circuit board 14 which also supports and provides power to a LED light source 16. Circuit board 14 may include additional components such as drivers, processors, and other electrical circuitry. Although a single light source 16 is shown, it is known to use multiple light sources. An upper portion 18 of holder 10 includes a recess 20 to receive a diffuser 22. Diffuser 22 assists in providing an even distribution of light intensity across a display area 24 of LCD 26 which is supported by holder 10. Diffuser 22 may also be attached directly to LCD 26.

SUMMARY OF THE INVENTION

The present invention provides improved holders for LCD displays and covers for backlit displays.

In an exemplary embodiment of the present invention, an apparatus for providing a backlit display is provided. The apparatus comprising: at least one illumination source configured to emit light having a first spectrum; a backlit component; and a one-piece holder configured to support the backlit component. The holder having a first portion positioned between the at least one illumination source and the backlit component. The first portion including a fluorescing material which absorbs at least a portion of the light having the first spectrum and emits light having a second spectrum to provide appropriate lighting for the backlit component.

In a further exemplary embodiment of the present invention, an apparatus for providing a backlit display is provided. The apparatus comprising: at least one illumination source configured to emit light having a first spectrum; a backlit component; and a holder configured to support the backlit component. The holder having a first portion positioned between the at least one illumination source and the backlit component. The first portion including a fluorescing material which absorbs at least a portion of the light having the first spectrum and emits light having a second spectrum to provide a display lighting for the backlit component. The first portion being configured to minimize color variation in the display lighting by providing a generally equal path length for the light passing through the first portion.

In still a further exemplary embodiment of the present invention, a display apparatus is provided. The display apparatus comprising: at least one illumination source configured to emit light having a first spectrum; and a trim plate positioned in front of the at least one illumination source. The trim plate including a fluorescing material which absorbs at least a portion of the light having the first spectrum and emits light having a second spectrum to provide a display lighting, the trim plate having a front face whereupon graphic indicia are provided in at least one region. The front face of the trim plate providing a solid support in the at least one region which also provides the display lighting for the graphic indicia.

In an exemplary method of the present invention, a method for providing a backlit display is provided. The method comprising the steps of: providing at least one illumination source configured to emit light having a first spectrum and a backlit component; and positioning a holder between the at least one illumination source and the backlit component. The holder having a light-transmitting first portion that is configured to provide a generally equal path length for light passing from the at least one illumination source through the light-transmitting first portion of the holder on to the backlit component for backlighting the backlit display. The light-transmitting first portion including one or more fluorescing materials which absorb light of the first spectrum and emit light of a second spectrum.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
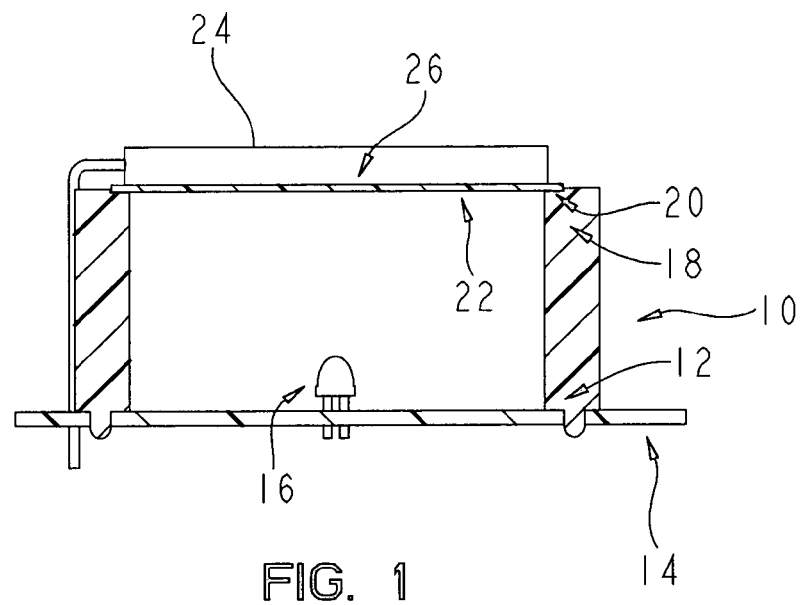
FIG. 1 is a representative view of a prior art backlit LCD display.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments discussed below are not intended to be exhaustive or limit the invention to the precise forms disclosed in the following detailed description. Rather, the embodiments are chosen and described so that others skilled in the art may utilize their teachings.

Figure 2:
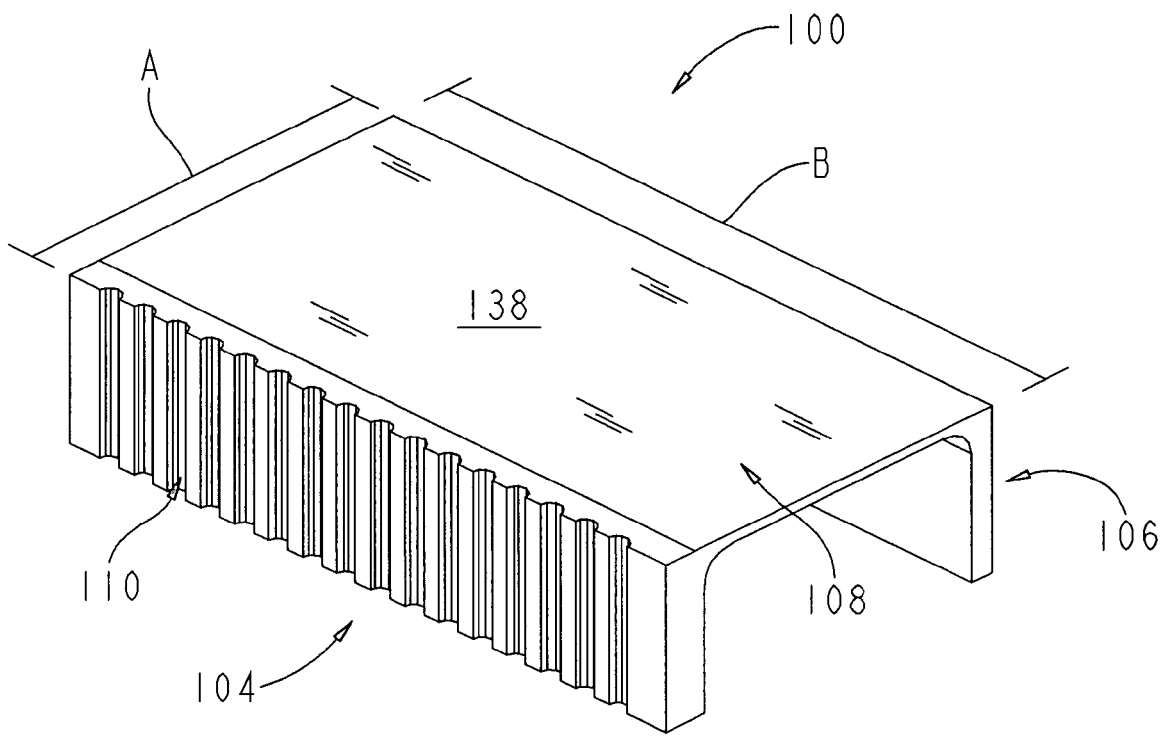
FIG. 2 is an isometric view of an exemplary LCD holder.

Referring to FIG. 2, an exemplary holder 100 for an LCD display 102 (see FIG. 3) is shown. Holder 100 illustratively includes a first wall 104 and a second wall 106 and a top portion 108 connecting the first wall 104 and the second wall 106. As shown top portion 108 is generally rectangular to accommodate a generally rectangular LCD 102. However, the shape of top portion 108 and hence holder 100 is not limited to rectangular, but rather may be formed of any shape required to accommodate the display area of LCD 102, including square, rectangular, circular, elliptical, and amorphous. In another embodiment, holder 100 includes end walls such that holder 100 provides a hollow rectangular box as opposed to a U-shaped channel to assist in containing stray light.

In one embodiment, top portion 108 is generally flat to provide a flat surface for supporting LCD 102. Top portion 108 supports LCD 102 during and after soldering connections 126 to circuit board 120. In the illustrated embodiment, wall 104 is thicker than wall 106 and includes a plurality of scallop shaped recesses 110. Recesses 110 provide guides for connections 126 between LCD 102 and circuit board 120. In an alternative embodiment, walls 104 and 106 are generally smooth. Walls 104 and 106 are illustratively shown as being generally normal to top portion 108. In an alternative embodiment, walls 104 and 106 are tapered either inward or outward.

Figure 3:
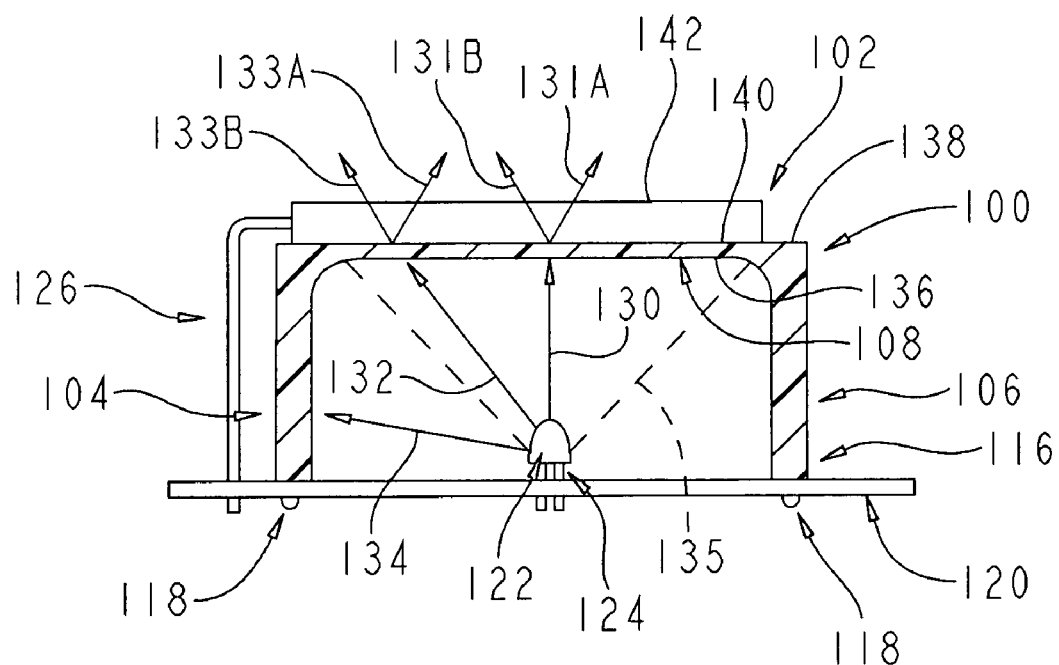
FIG. 3 is a representative view of the exemplary LCD holder of FIG. 2 included as part of a backlit LCD display.

Referring to FIG. 3, holder 100 is shown supporting LCD 102 on top portion 108. In one embodiment, LCD 102 may be secured to top portion 108. A lower portion 116 of holder 100 is supported by a circuit board 120. In one embodiment lower portion 116 of holder 100 includes tabs or pins 118 which are received in openings in circuit board 120 to couple holder 100 to circuit board 120. Circuit board 120 also supports a light source 122, illustratively a LED. As is known in the art, circuit board 120 also provides power to both light source 122 and LCD 102 through connections 124 and 126 respectively.

Illustratively, light source 122 is shown as a single LED. However, in one embodiment light source 122 includes a plurality of LEDs. In one embodiment, light source 122 is a blue LED. Any suitable light source may be used including surface mount LEDs, bulb shaped LEDs, laser sources, and other suitable sources.

In one embodiment, holder 100 is a one-piece component. As such, walls 104, 106 and top portion 108 are formed as a single component. In one embodiment, holder 100 is made of generally non-opaque, light transmissive, polymeric material (such as a thermoplastic) and is molded, such as by injection molding.

The polymeric material used to create holder 100 includes one or more diffusing substances and/or one or more fluorescing materials. The diffusing substance may be of any composition that introduces light scattering particles into holder 100. Exemplary diffusing substances include silica and acrylic base. The fluorescing materials absorb a portion of a first spectrum of light and emit a second spectrum of light. Exemplary fluorescing materials include dyes and pigments, such as standard powder dyes like BASF Lumogen (R) series available from BASF Corporation located at 100 Campus Drive, Florham Park, N.J. 07932. Additional exemplary diffusing substances, fluorescing materials and/or methods of manufacture of suitable polymeric materials are provided in U.S. Pat. No. 5,477,430, U.S. Published Application US 2004/0120140 A1, Ser. No. 10/732,987, and U.S. patent application Ser. No. 10/107,766, filed Mar. 27, 2002, the disclosures of which are expressly incorporated by reference herein. The dye or dyes are selected based on the type of light source 122 used and the desired color or colors for LCD 102. In one embodiment, the diffusing substances and the fluorescing material present in holder 100 is generally evenly dispersed throughout holder 100.

In one embodiment, holder 100 is made of light transmissive Polycarbonate including at least one diffusing substances and including at least one fluorescing dye. Holder 100, in this embodiment, is designed to convert generally relatively short wavelength light from a source to generally longer wavelength light for backlighting LCD 102.

In operation, light of a first spectrum is emitted by light source 122. If multiple colors are desired light sources 122 of varying spectra may be used. Illustratively, light rays 130, 132, and 134 are shown being emitted from light source 122. Light rays 130 and 132 are incident on a bottom surface 136 of top portion 108 and at least a portion of each enters top portion 108. Through interaction with the fluorescing material in top portion 108, at least a portion of the light energy entering top portion 108 is absorbed and emitted as light energy having a second spectrum. Illustratively light ray 130 is shown generating light rays 131a and 131b each having generally the same second spectrum. Illustratively light ray 132 is shown generating light rays 133a and 133B each having generally the same second spectrum. Light rays 131 and 133 exit a top surface 138 of top portion 108 and pass through an underside window 140 of LCD 102 and finally through a front window 142 of LCD 102. Light rays 131 and 133 are exemplary of the display light of LCD 102.

In one embodiment, light ray 134 interacts with wall 104 similar to the interaction of light ray 130 with top portion 108. In another embodiment, an inside surface 144 of wall 104 and an inside surface of wall 106 is coated with a reflective material such that light ray 134 is redirected towards top portion 108 or an opaque material such that light ray 134 cannot enter the respective wall 104, 106.

Based on the angle of incidence between light ray 132 and a normal to bottom surface 136 at the point light ray 132 contacts surface 136 relative to the angle of incidence between light ray 130 and a normal to bottom surface 136 at the point light ray 130 contacts surface 136, a variation in the spectrum of light rays 131 and light rays 133 (the display light) is introduced. The color variation is generally caused by the path length of a given light ray within top portion 108. The path length differs based on the angle of incidence of the light ray and a normal to bottom surface 136 at the point the light ray contacts surface 136. It should be noted that the diffusing substances in top portion 108 act to diffuse, or lengthen the path length of the various light rays. However, assuming that the diffusing substances are uniformly dispersed then generally proportioned path length additions are made in both light rays 130, 132.

The longer the path length through top portion 108 the greater the amount of the incident light ray that is absorbed by top portion 108 (assuming a uniform dispersion of the diffusing substances and the fluorescing materials). Conversely, the shorter the path length through top portion the greater the amount of the incident light ray that passes through top portion 108 unabsorbed. Therefore, referring to FIG. 3 and assuming that light source 122 is a blue LED, light rays 131 will have a larger blue component (due to the greater amount of unabsorbed blue light from light ray 130 that passes through top portion 108) than light rays 133. Assuming that the fluorescing material in top portion 108 is chosen to provide a green light, the portion of LCD 102 illuminated by light rays 131 will appear to be less green and more blue to an observer than the portion of LCD 102 illuminated by light rays 133. The degree of color variation is increased when one or both of a width A of holder 100 and a length B of holder 100 is increased to accommodate larger size LCDs 102.

In addition, an increased angle of incidence for a given light ray also increases the amount of energy of the light ray that is reflected by surface 136. As such, less energy enters top portion 108 and the overall intensity of the light exiting top portion 108 at surface 138 is reduced.

As explained in more detail in U.S. Published Patent Application US 2004/0120140 A1, Ser. No. 10/752,587, the disclosure of which is expressly incorporated by references herein, changing the thickness of top portion 108 alters the coloration of light rays 131 and 132. This is once again generally due to changes in the path length. Therefore, once again assuming that light source 122 is a blue LED and that the fluorescing material is chosen to provide a green light, adding additional thicknesses to top portion 108 will drive the resultant color of the display light to be more green and removing thickness from top portion 108 will drive the resultant color of the display light to be more blue. Similar effects may be achieved by either increasing or decreasing the amount of fluorescing material in top portion 108.

Such color variation in the display light may be reduced by increasing the number of light sources 122 which illuminate back surface 136 of top portion 108. However, in one embodiment it is desirable to minimize the number of light sources 122 which are needed to illuminate LCD 102 with minimal variation in color of the illuminated light. In one embodiment, the variation in color in the display light is reduced by requiring that light rays 130, 132 maintain a generally equal path length through top portion 108. As used herein, "generally equal path length" includes variations in the path length that do not produce perceptible variations in the color of the display light of LCD 102 at different points across LCD 102. In one embodiment, the shape of top portion 108 is selected such that a cone of light 135 emitted by light source 122 has a generally equal path length through top portion 108. Cone of light 135 corresponds to light emitted by light source 122 which will ultimately illuminate a portion of LCD 102 and does not necessary include all of the light emitted by light source 122, such as light ray 134. Light ray 130 is generally in an axial portion of light cone 135 and light ray 132 is generally in a periphery portion of light cone 135.

In one embodiment, the shape of top portion 108 should approximate the shape of a wavefront of light cone 135. In one example, light source 122 may be considered to be a point source, resulting in top portion 108 being generally spherical with a radius of curvature aligned with the light source 122.

Figure 5:
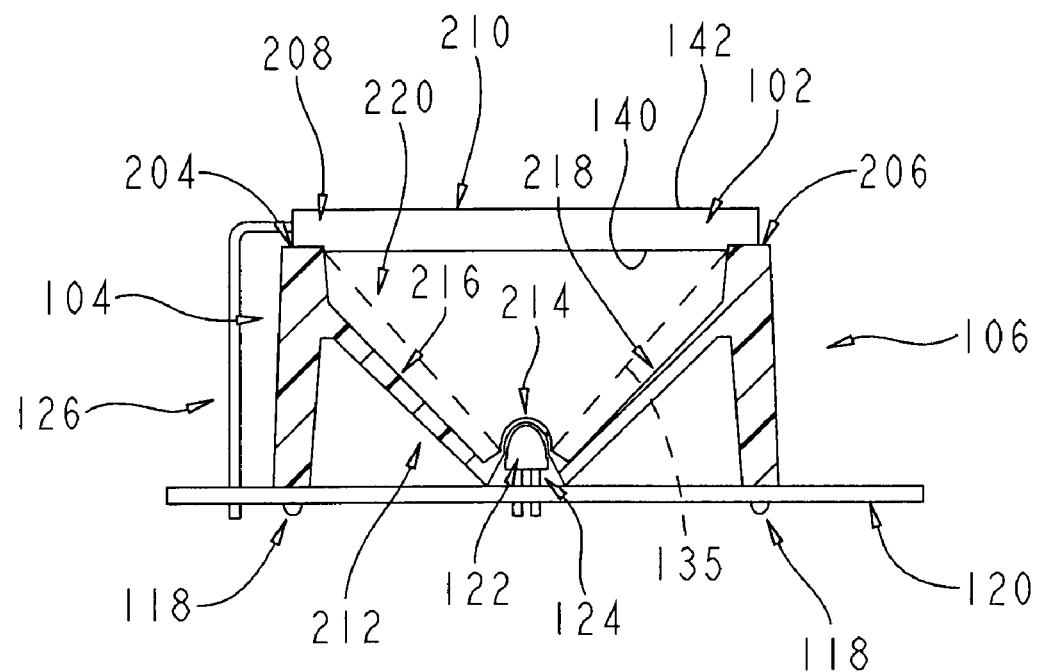
FIG. 5 is a representative view of the exemplary LCD holder of FIG. 4 included as part of a backlit LCD display.
Figure 4:
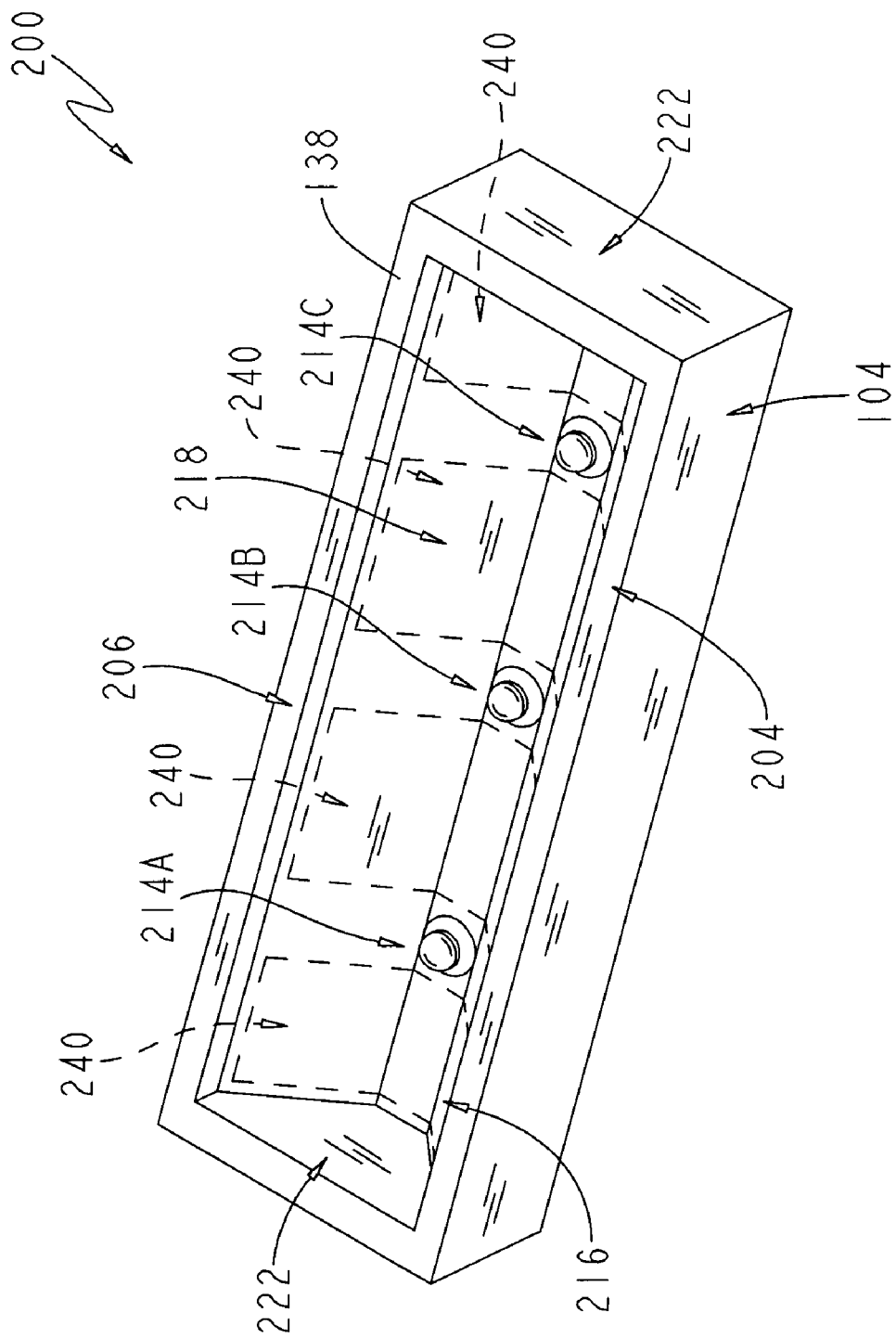
FIG. 4 is an isometric view of another exemplary LCD holder.

Referring to FIGS. 4 and 5, a second holder 200 is shown. Holder 200 is generally similar to holder 100 and provides a generally equal path length for the light emitted by light source 122 through holder 200 to reduce the amount of color variation in the display lighting of LCD 102. In one embodiment, holder 200 is made from a light transmissive polymeric material. Holder 200 includes walls 104 and 106 and end walls 222. Top portions 204 and 206 of walls 104 and 106, respectively support a periphery 208 of LCD 102. Walls 104 and 106 are connected by a central portion 212. A central portion 210 of LCD 102 is not directly supported by holder 200, but rather an air gap 220 is provided between central portion 212 of holder 200 and surface 140 of LCD 102. Air gap 220 acts as a diffuser to assist in evening out variations in the intensity of light emitted by central portion 212.

Central portion 212 includes a first portion 214 which provides a generally equal path length for light emitted by light source 122 as it travels through first portion 214. Referring to FIG. 4, central portion 212 includes first portions 214a, 214b, 214c, each for receiving a corresponding light source 122. First portions 214a, 214b, 214c are shown as being generally identical, but may be different in order to accommodate differing types of light sources 122. In the illustrated embodiment, first portion 214 (see FIGS. 4 and 5) has a generally rounded cylindrical shape to approximate the shape of light source 122. As stated above, by providing a generally equal path length for the light emitted by light source 122 the amount of color variation which is noticeable to an observer of LCD 102 is minimized.

In one embodiment, first portion 214 has a generally constant wall thickness and has a generally constant offset from illumination source 122 to provide a generally equal path length. As stated herein, a change in the thickness of first portion 214 changes the amount of light from the illumination source 122 that is absorbed by first portion 214 and hence changes the resultant color of the display lighting.

First portion 214 is supported by first and second supports 216, 218 which connect first portion 214 to walls 104, 106, respectively. In one embodiment, supports 216 and 218 are solid. In another embodiment, supports 216, 218 include one or more open regions to provide clearance for other elements on circuit board 120, such as drivers (not shown). Exemplary open regions are indicated by dashed areas 240 in FIG. 4.

In one embodiment, first portion 214 is offset from the light source 122a by about two millimeters to about three millimeters. Larger offsets may be used. Further, smaller offsets may be used. However, in one embodiment, a minimum offset of about two millimeters is used because at smaller offsets a larger percentage of the light energy passes through a smaller area of first portion 214. This increased energy density may result in changes in the color produced by the fluorescing material over time. In one embodiment, additives may be included in first portion 214 to minimize this change in color with additional radiation. Exemplary additives include a far ultraviolet absorber.

The shape of first portion 214 is generally dictated by the light emitting characteristics of light source 122. As such, the shape of first portion 214 may differ if other types of light sources are implemented. In one embodiment, surface mount LEDs having generally flat light emitting areas are implemented which emit a diverging cone of light. In this case, the shape of first portion 214 is generally flat for surface mount LEDs or spherical for leaded LEDs, such as T1 LEDs, due to the light emitting characteristics of the respective LEDs.

In one embodiment, first portions 214A-C are made separate from the remainder of holder 200 and are coupled to circuit board 120. As such, the separate first portions 214A-C may be made from a light transmissive polymeric material, such as a thermoplastic, having fluorescing material and/or diffusing substances while the remainder of holder 200 is made from a polymeric material, such as a thermoplastic material, without fluorescing material or diffusing substances. In one embodiment, the remainder of holder 200 is made from a non-light transmissive material.

Figure 6:
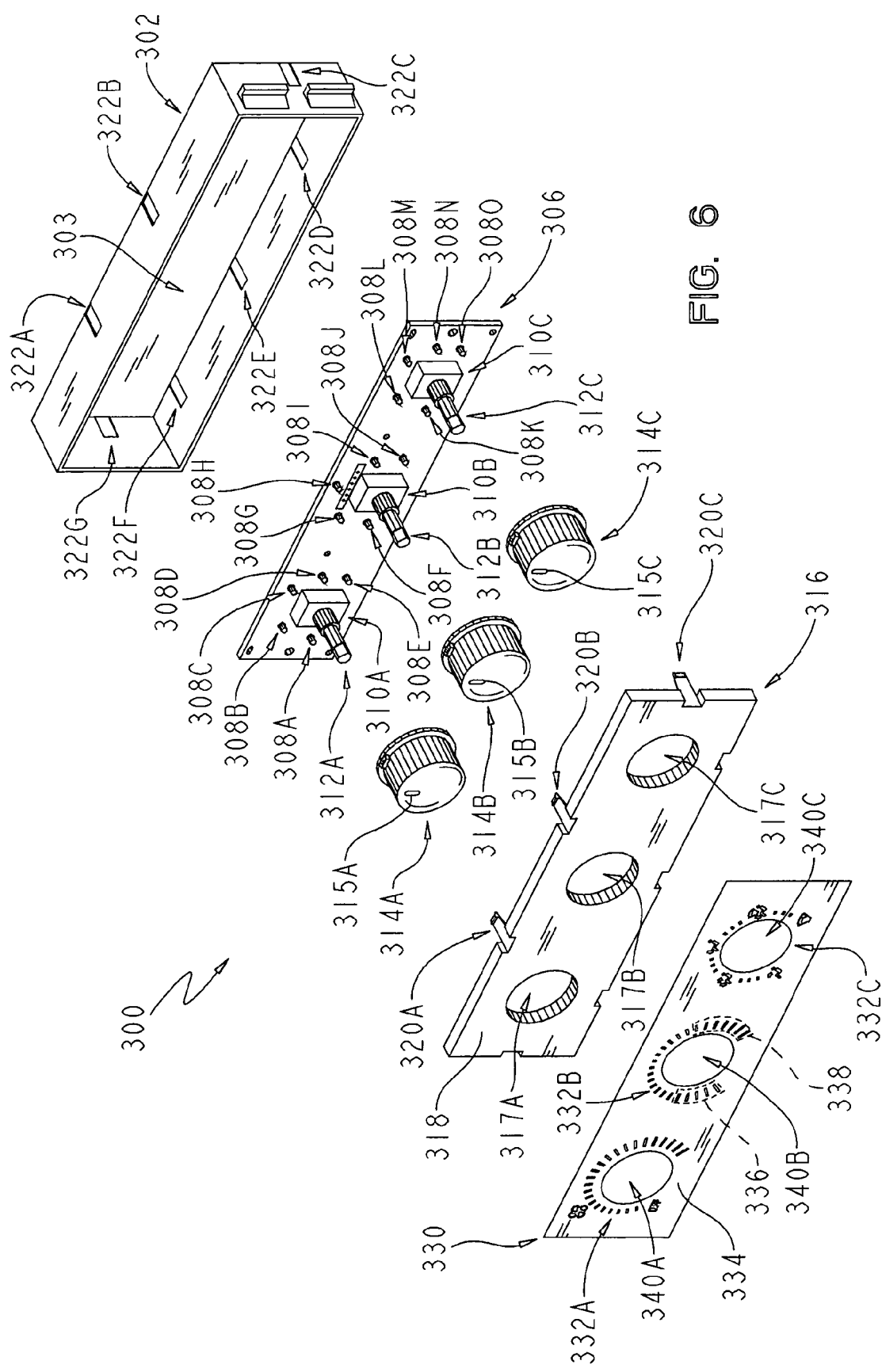
FIG. 6 is an isometric view of an exemplary accessory assembly for the control of heating and cooling in an automobile.

Referring to FIG. 6, another display apparatus 300 is shown. Display apparatus 300 includes a case 302 having a cavity 303 to receive a circuit board assembly 306. Circuit board assembly 306 illustratively includes a plurality of light sources 308A-O and three rotatably actuated controls 310A-C. Each of controls 310A-C includes a respective stem 312A-C which is received in a recess (not shown) in a respective knob 314A-C. Knobs 314A-C may include light guides or passageways such that one or more of light sources 308A-O illuminate a graphic indicia 315A-C enabling graphic indicia 315A-C to be seen in low light environments.

Knobs 314A-C extend through respective openings 317A-C in a trim plate or cover 316. In other embodiments, trim plate 316 includes openings to receive other types of controls, such as buttons or sliders. A user may rotate knobs 314A-C from a front side 318 of trim plate 316. Trim plate 316 includes a plurality of tabs 320 (320A-C being shown), which are received in respective slots 322A-G in case 302. Trim plate 316 and case 302 cooperate to hold and/or support circuit board assembly 306 and knobs 314. In one embodiment, circuit board assembly 306 is coupled to case 302.

Trim plate 316 is made from a generally non-opaque, light transmissive, polymeric material, similar to holder 100. As such, trim plate 316, in one embodiment is modeled, such as injection modeled, from a polymeric material which includes one or more diffusing substances and/or one or more fluorescing materials. As such, unless coated, such as painted, trim plate or cover 316 generally converts light emitted by light sources 308A-O having a first spectrum to light visible to an observer from the front side 318 of rim plate 316 having a second spectrum.

In the embodiment, shown in FIG. 6, an information label 330 is secured to front surface 318 of trim plate 316. Information label 330 may be secured by any suitable method, such as an adhesive. Information label 330 further includes openings 340A-C to receive knobs 314A-C.

Information label 330 includes a plurality of graphic indicia generally denoted as 332A, 332B, 332C and a surrounding area 334. In one embodiment, surrounding area 334 is generally opaque and graphic indicia 332A-C is at least partially transparent and either colorless or colored. As such, to an observer from a front face 331 of information label 330, only graphic indicia 322A-C will be illuminated by the light emerging from front surface 318 of trim plate 316. In one embodiment, various portion of graphic indicia 332A-C are colored different colors. For example, in one embodiment, portion 336 is colored blue to indicate cold air and portion 338 is colored red to indicate hot air.

In one embodiment, trim plate 316 is a one-piece component that has a solid front face 318 except for openings 317A-C provided for access to control devices, such as knobs 314A-C. By providing a solid front face 318 behind the graphics indicia 332A-C of information label 330, display 300 reduces the possibility that a hole will be poked in information label 330 because there is not a void behind the various graphics indicia.

Figure 7:
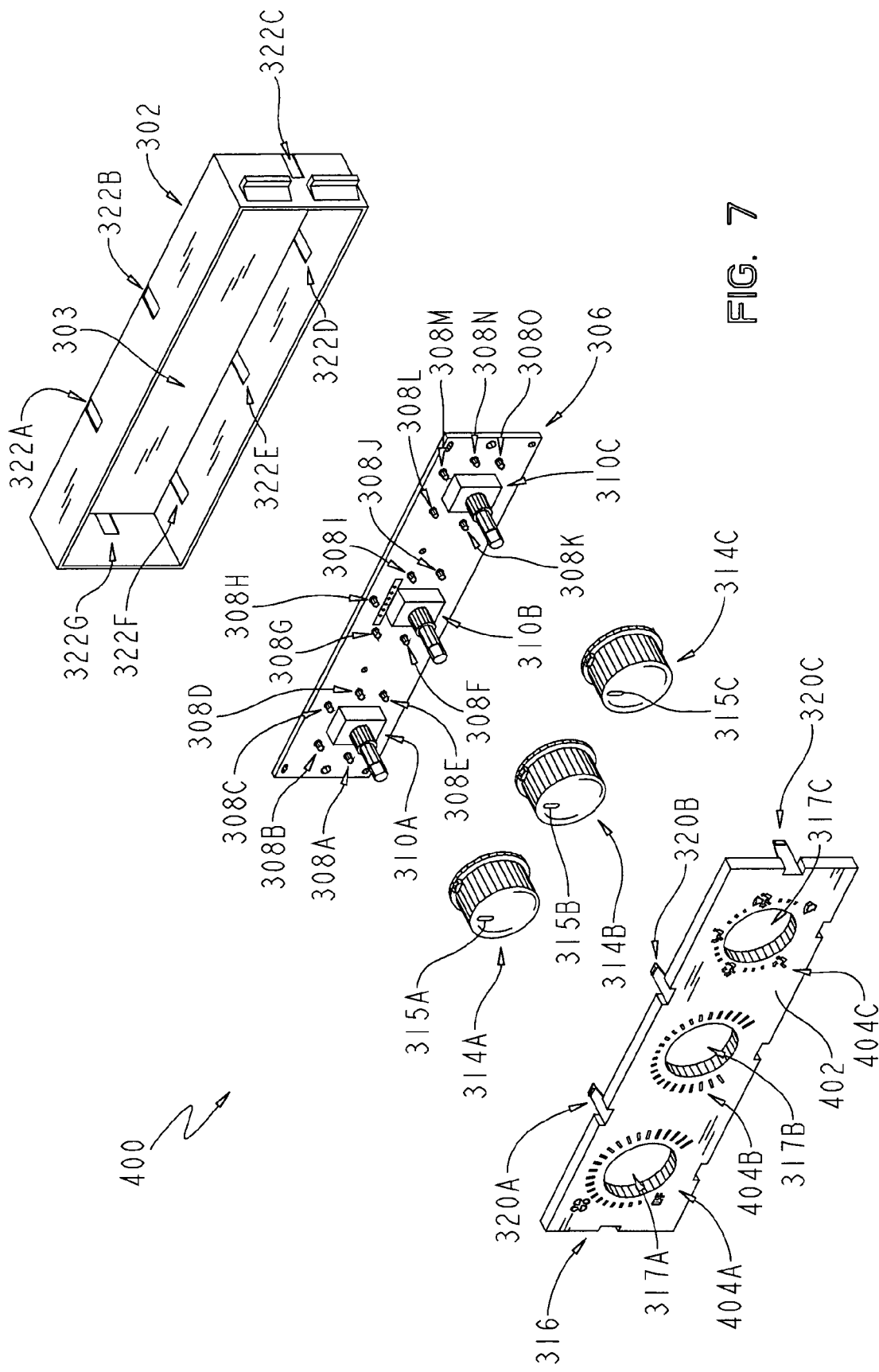
FIG. 7 is an isometric view of another exemplary accessory assembly for the control of heating and cooling in an automobile.

Referring to FIG. 7, another display apparatus 400 is shown. Display apparatus 400 is generally similar to display apparatus 300. Display apparatus 400 differs from display apparatus 300 in that information label 330 is replaced by painting and laser etching front surface 318 of trim plate 316. Front surface 318 (visible in FIG. 6) is painted with a non-opaque paint, such as white and/or additional non-opaque colors. Then an opaque paint or surface 402 (visible in FIG. 7) is applied over the non-opaque paint. Subsequently, portions of the opaque paint 402 is removed by laser etching to expose the underlying non-opaque paint layer. The portions removed form graphics indicia 404A-C.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An apparatus for providing a backlit display, the apparatus comprising:
at least one illumination source configured to emit a cone of light having a first spectrum;
a backlit component; and
a one-piece holder configured to support the backlit component, the holder having a first portion positioned between the at least one illumination source and the backlit component, the first portion including a fluorescing material which absorbs at least a portion of light having the first spectrum and emits light having a second spectrum to provide appropriate lighting for the backlit component, where said first portion has a shape that approximates a wavefront of said cone of light so that all light rays within said cone of light have a substantially equal path length through said first portion and substantially equal absorption by said fluorescing material.

2. The apparatus of claim 1, wherein a spacing between said first portion and a periphery of the illumination source is substantially constant.

3. The apparatus of claim 1, wherein the illumination source has a shape that corresponds to the wavefront of said cone of light, and said first portion has a share that approximates the shape of said illumination source.

4. The apparatus of claim 1, further comprising a base member for supporting said illumination source and said first portion.

5. A method for providing a backlit display, the method comprising the steps of:
  providing a backlit component and at least one illumination source configured to emit a cone of light having a first spectrum; and
  positioning a holder between the illumination source and the backlit component, the holder having a light-transmitting first portion including one or more fluorescing materials which absorb light of the first spectrum and emit light of a second spectrum for backlighting the backlit display, said first portion having a shape that approximates a wavefront of said cone of light so that all light rays within said cone of light have a substantially equal path length through said first portion and substantially equal absorption by said fluorescing materials.

6. The method of claim 5, further comprising the step of supporting the backlit component with a second portion of the holder, wherein the backlit component is a liquid crystal display and wherein the first portion of the holder is spaced apart from a back surface of the liquid crystal display.

* * * * *